United States Patent Office 3,020,900
Patented Feb. 13, 1962

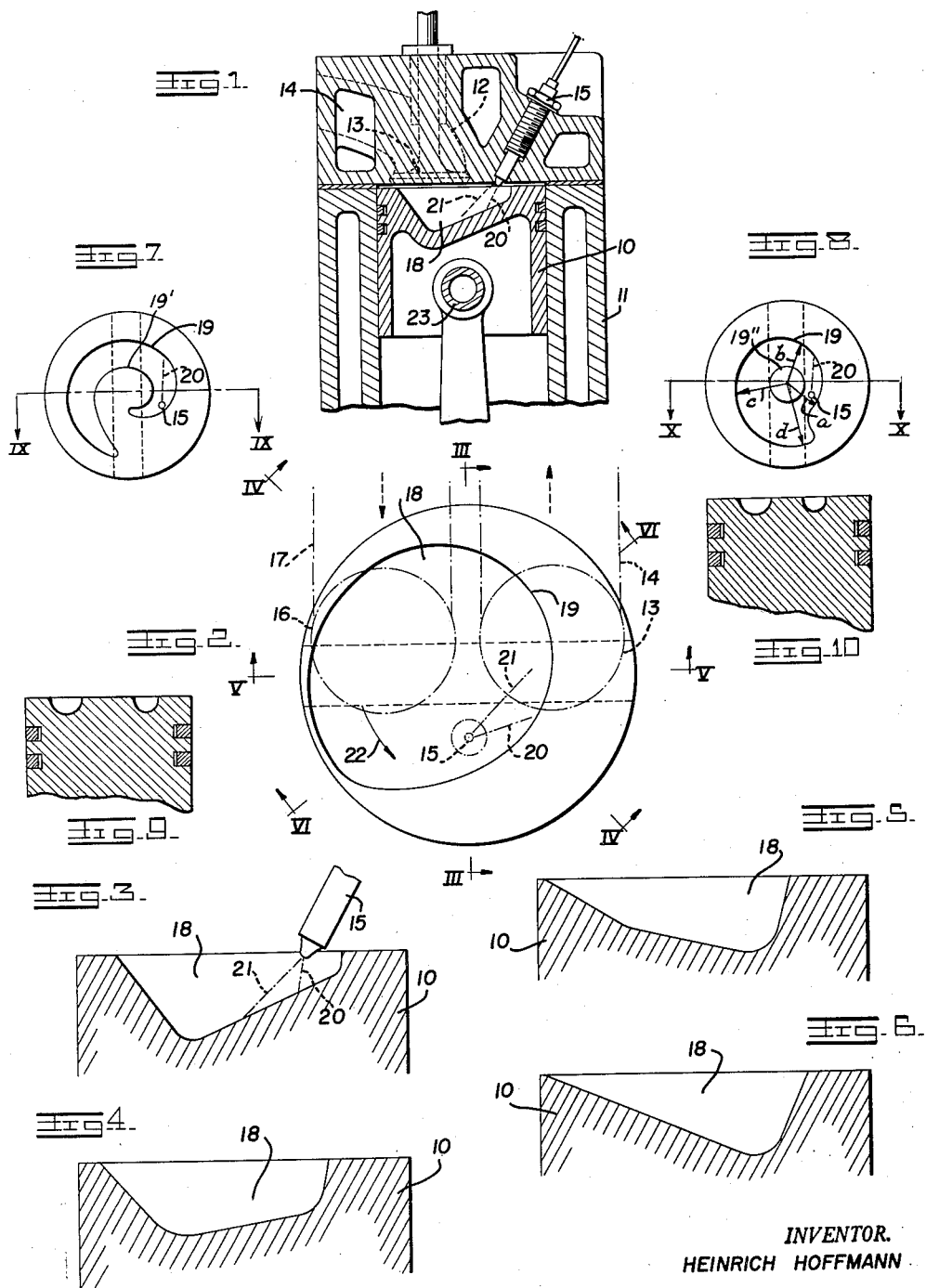

3,020,900
COMBUSTION CHAMBER FOR COMPRESSION IGNITION, INJECTION-TYPE INTERNAL COMBUSTION ENGINES
Heinrich Hoffmann, Stuttgart-Unterturkheim, Germany, assignor to Daimler-Benz Aktiengesellschaft, Stuttgart-Unterturkheim, Germany
Filed Mar. 9, 1959, Ser. No. 797,972
Claims priority, application Germany Mar. 15, 1958
7 Claims. (Cl. 123—32)

The present invention relates to a combustion chamber formed in the piston of a compression-ignition, injection-type internal combustion engine in which the angle between the direction of one or a plurality of fuel jets injected into the combustion chamber and the wall of the combustion chamber lies within a range of 10° to 90° and particularly in which means are provided to impart a rotary movement to the combustion air about an axis parallel to the cylinder axis and essentially in the direction of the injected fuel and which consists essentially therein that the wall of the combustion chamber, as seen in a plan view, assumes essentially the shape of a spiral which, starting from the region where the fuel jet impinges the chamber wall, gradually widens or enlarges in the direction of the fuel jet.

Contrary to conventional combustion chambers delimited by circularly-shaped walls, the inventively spiral-shaped combustion chamber has the advantages that the fuel, in its movement within the chamber, is not appreciably decelerated or retarded inasmuch as the fuel is given an opportunity to yield somewhat to the centrifugal force thereof and, as a result of the spiral shape, the surface over which the fuel is swept is greatly extended in the longitudinal direction.

Both of these features are effective in such manner that the fuel is being distributed over a larger surface which in turn favorably effects the mixture formation. The combustion air rotating in the direction of the fuel spray, supports the spreading of the fuel.

In a further embodiment of the present invention, the combustion chamber is formed as a channel having a spiral shape. The combustion chamber may also be shaped as a channel with the inner wall thereof being made circular while the outer wall of the chamber assumes the shape of a spiral.

Especially advantageous, however, is an arrangement according to the present invention in which the combustion chamber formed in the piston has the shape of a conical depression with the boundary wall thereof at the beginning of the spiral being steeply inclined so as to form an angle with the piston top of approximately 80° to 90°, whereas with the approach of the spiral toward the perimeter of the piston, the inclination of the combustion chamber wall gradually diminishes to form an angle with the piston top of approximately 15° to 30°. In this manner, the surface available for distributing or splitting up of the fuel is greatly increased thereby that the surface of the combustion chamber, in the regions most remote from the injection nozzle, becomes flatter.

Accordingly, it is an object of the present invention to provide an internal combustion engine with a combustion chamber in which the distribution of the injected fuel is supported by a rotary movement of the combustion air.

It is a further object of the present invention to provide an internal combustion engine with a combustion chamber into which the fuel is injected essentially in the direction of the rotating combustion air.

Still another object of the present invention resides therein that the internal combustion engine is provided with a combustion chamber having a shape such as to enable the injected fuel to spread over the largest possible surface thereof.

Another object of the present invention is to provide an internal combustion engine with a combustion chamber of such shape that the retardation of the injected fuel within the chamber is kept to a minimum.

Still another object of the present invention is to provide an internal combustion engine with a combustion chamber in which the mixture formation of the fuel and air is effected most efficiently.

These and other objects, features and advantages of the present invention will become more obvious from the following description when taken in connection with the accompanying drawing which shows, for purpose of illustration only, several embodiments in accordance with the present invention, and wherein:

FIGURE 1 illustrates schematically a partial cross-sectional view through the piston and cylinder head of an internal combustion engine according to the present invention;

FIGURE 2 illustrates schematically an enlarged top view of the piston shown in FIGURE 1 and rotated 90°;

FIGURE 3 illustrates schematically a cross-sectional view through the combustion chamber taken along line III—III of FIGURE 2;

FIGURE 4 is a cross-sectional view of the combustion chamber taken along line IV—IV of FIGURE 2;

FIGURE 5 is a cross-sectional view through the combustion chamber taken along line V—V of FIGURE 2;

FIGURE 6 is a cross-sectional view of a combustion chamber taken along the line VI—VI of FIGURE 2;

FIGURE 7 illustrates, as a further embodiment, a top view of the piston provided with a combustion chamber having the form of a spiral shaped channel, and FIGURE 8 illustrates as another embodiment of the present invention a top view of the piston provided with a combustion chamber in which only the outer wall thereof is spiral shaped.

FIGURE 9 is a cross-sectional view of a combustion chamber taken along line IX—IX of FIGURE 7.

FIGURE 10 is a cross-sectional view of a combustion chamber taken along line X—X of FIGURE 8.

Referring now to the drawing wherein like reference numerals are used throughout the various views to designate like parts, and more particularly to FIGURE 1, reference numeral 10 designates the piston of an internal combustion engine slidably mounted in a cylinder 11 provided with a cylinder head 12. The inlet and exhaust valves are disposed one next to the other in the cylinder head 12 in a plane parallel to the wrist pin 23 mounted in the piston 10.

The exhaust valve 13 and the exhaust duct 14 are shown in FIGURE 1 in dotted lines. The injection nozzle is designated by numeral 15.

FIGURE 2 illustrates in a plan view of the piston top an inlet valve 16 and an inlet duct 17. A combustion chamber 18 is formed in the piston 10 with the boundary wall 19 thereof having the shape of a spiral.

FIGURES 3–6 show the boundary wall 19 of the combustion chamber 18 being steeply inclined in the region closest to the center of the chamber which corresponds to the righthand side of the piston top shown in FIGURE 2, and further show how this wall 19 becomes gradually flatter as the line of intersection between the wall 19 and the top surface of the piston approaches the perimeter of the piston 10.

As, for instance, shown in FIGURE 2, the fuel is injected into the combustion chamber 18 by means of one or a plurality of fuel jets 20 and 21 whereby the free length of these jets measured from the nozzle 15 to the respective contact thereof with the combustion chamber wall 19 is different from one another.

By means of a suitable formation of the inlet duct 17 as shown in FIGURE 2, or a corresponding suitable construction of the inlet valve 16, a rotary movement about the cylinder axis is imparted to the combustion air drawn into the cylinder 11 in the direction designated by the arrow 22. This rotary movement of the combustion air within the combustion chamber is essentially maintained therein during the compression stroke and the direction of rotation essentially coincides with the direction of the fuel jets 20 and 21.

The injected fuel may thereby spread itself over a large surface inasmuch as its flow energy, as a result of the spiral-shape of the wall 19, is not appreciably suppressed because a relatively large surface is available to the fuel by means of this spiral path, the gradual flattening of the inclined wall 19 and the support of its movement by the rotating combustion air.

Similar considerations are applicable in the construction of the combustion chambers shown in FIGURES 7 and 8 even though the feature of a gradually flatter wall which supports the spreading of the fuel in the combustion chamber according to FIGURES 1–6 is not inherent in the embodiments according to FIGURES 7 and 8.

FIGURE 7 thereby illustrates a combustion chamber formed by a spirally-shaped channel in the top of the piston 10 with the outer wall 19 and the inner wall 19′ extending essentially parallelly over a substantial portion of the channel length. The fuel is again injected against the outer wall 19 by means of fuel injection nozzle 15, located near the narrowed point of the channel, as indicated by the jet 20 shown in dashed line in FIGURE 7.

FIGURE 8 illustrates still another modified embodiment in accordance with the present invention, similar to FIGURE 7, in which, however, the inner wall 19″ of the channel-shaped combustion chamber is of essentially circular configuration so that the channel-shaped combustion chamber gradually increases in width from the narrowest point thereof, where the injection nozzle 15 is located, to the end portion thereof, as shown in FIGURE 8 by the various radial dimensions $a$, $b$, $c$ and $d$.

While I have shown and described several embodiments in accordance with the present invention, it is understood that the same is not limited thereto but is susceptible of many changes and modifications within the spirit and scope of the present invention and I, therefore, do not wish to be limited to the details shown and described herein, but intend to cover all such changes and modifications as encompassed by the scope of the appended claims.

I claim:

1. A combustion chamber for compression ignition, injection-type internal combustion engines comprising cylinder means, piston means slidably mounted in said cylinder means, a combustion chamber having wall means formed by said piston means, cylinder head means, injection means injection means located in said cylinder head means for injecting at least one jet of fuel into said combustion chamber, the direction of said jet forming an angle with the wall of said combustion chamber ranging between approximately 10° to 90°, said cylinder head means being provided with inlet means for supplying combustion air to said cylinder means including means for imparting a rotary movement to said combustion air about an axis essentially parallel to the axis of said cylinder means and essentially in the direction of said fuel jet, said wall means of said combustion chamber being of a shape comprising an essentially spiral conformation as viewed in a plan view thereof whereby the flow energy of said fuel is not appreciably suppressed and said spiral conformation being enlarged from a point of contact of said fuel with said chamber wall in the direction of said fuel jet.

2. A combustion chamber according to claim 1, wherein said injection means comprises a nozzle for injecting a plurality of fuel jets into said combustion chamber, the respective free lengths of all of said jets between said nozzle and the respective point of contact with said combustion chamber being different from one another.

3. A combustion chamber according to claim 1, wherein said inlet means includes inlet valve means provided with guide means for imparting said rotary movement to the combustion air.

4. A combustion chamber according to claim 1, wherein said combustion chamber is formed as a spiral shaped channel.

5. A combustion chamber according to claim 1, wherein said combustion chamber has the form of a channel with the inner boundary wall thereof being essentially circular in shape while the outer boundary wall thereof is spiral shaped.

6. A combustion chamber according to claim 1, wherein said combustion chamber is formed as a tapered recess with the wall thereof at the commencement of said spiral inclined to form an angle of approximately 80° to 90° with the top surface of said piston, whereas the inclination of said wall as it approaches the perimeter of said piston is made gradually flatter to form an angle with said piston top surface of approximately 15° to 30°.

7. A combustion chamber for compression ignition, injection-type internal combustion engines comprising cylinder means, piston means slidably mounted in said cylinder means, a combustion chamber having wall means formed by said piston means, cylinder head means, injection means located in said cylinder head means for injecting at least one jet of fuel into said combustion chamber, the direction of said jet forming an angle with the wall of said combustion chamber ranging between approximately 10° to 90°, said cylinder head means being provided with inlet means for supplying combustion air to said cylinder means including means for imparting a rotary movement to said combustion air about an axis essentially parallel to the axis of said cylinder means and essentially in the direction of said fuel jet, said wall means of said combustion chamber being of a shape comprising an essentially spiral conformation shape as viewed in a plan view thereof, whereby the flow of energy of said fuel is not appreciably suppressed.

No references cited.